US007129410B2

(12) United States Patent
Kanazawa

(10) Patent No.: US 7,129,410 B2
(45) Date of Patent: Oct. 31, 2006

(54) FUSE BOX

(75) Inventor: Masashi Kanazawa, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 0 days.

(21) Appl. No.: 11/151,225

(22) Filed: Jun. 14, 2005

(65) Prior Publication Data

US 2006/0024992 A1 Feb. 2, 2006

(30) Foreign Application Priority Data

Jul. 31, 2004 (JP) ............................ 2004-247557

(51) Int. Cl.
*H02G 3/08* (2006.01)

(52) U.S. Cl. ...................... 174/50; 174/559; 174/17 R; 174/59; 439/76.2; 439/949

(58) Field of Classification Search .................. 174/50, 174/59, 17 R, 135, 48, 17 VA, 60, 17 CT; 439/949, 76.1, 76.2, 535; 16/2.1, 2.2; 220/3.2, 220/3.8, 3.9, 4.02; 361/600, 601
See application file for complete search history.

(56) References Cited

U.S. PATENT DOCUMENTS 5,427,261 A * 6/1995 Naitou ...................... 220/3.8
5,435,453 A * 7/1995 Higuchi ...................... 220/3.8
5,531,345 A * 7/1996 Nakamura et al. ........... 220/3.8
5,645,448 A 7/1997 Hill
5,967,819 A * 10/1999 Okada ........................ 439/949
6,309,225 B1 * 10/2001 Kameyama ................ 439/76.1
6,545,217 B1 * 4/2003 Sato ............................ 174/50
6,629,619 B1 * 10/2003 Sato et al. ................. 220/4.02
6,768,054 B1 * 7/2004 Sato et al. ..................... 174/50
6,787,698 B1 * 9/2004 Higuchi et al. ............... 174/50
6,977,340 B1 * 12/2005 Nakamrura ................. 174/135
7,017,764 B1 * 3/2006 Okada ........................ 220/3.2
2004/0008503 A1 1/2004 Higuchi et al.

FOREIGN PATENT DOCUMENTS

EP 1 310 972 A1 5/2003
EP 1 482 530 A1 12/2004
JP A 9-308053 11/1997

* cited by examiner

*Primary Examiner*—Angel R. Estrada
(74) *Attorney, Agent, or Firm*—Oliff & Berridge, PLC

(57) ABSTRACT

In a fuse box mounted on a battery box, a lower end surface of a peripheral wall of an upper cover contacts a bottom wall of a lower cover that is locked to a case body of the fuse box or contacts a bottom wall of the case body to form a first watertight portion. A peripheral wall erect on the bottom wall of the case body is formed by spacing the peripheral wall at a pressure-reducing gap from an inner surface of the upper cover. A rib formed by outwardly bending an upper end of the peripheral wall of the case body is projected toward an inner surface of the peripheral wall of the upper cover to form a second watertight portion. The pressure-reducing gap is interposed between the first watertight portion and the second watertight portion.

2 Claims, 9 Drawing Sheets

PRIOR ART

FUSE BOX

FIELD OF THE INVENTION

The present invention relates to a fuse box. More particularly the fuse box is mounted on a battery box. The fuse box accommodates bus bars connected with a battery terminal and fuses connected with the bus bars and has a high waterproof function.

DESCRIPTION OF THE RELATED ART

As the conventional watertight construction of the fuse box mounted on vehicles and the like, the construction, shown in FIG. 9, which is disclosed in Japanese Patent Application Laid-Open No. 9-308053 (patent document 1) is known.

As shown in FIG. 9, the electric junction box 1 includes a case body 2 in which the bus bar 6 and the fuse 7 are mounted, the upper cover 3 mounted on the upper surface of the case body 2 to cover the upper surface thereof, and a lower cover 4 mounted on the lower surface of the case body 2 to cover the lower surface thereof. The case body 2 and the upper cover 3 are locked to each other with a locking portion 5*a*. The case body 2 and the lower cover 4 are locked to each other with a locking portion 5*b*. The rib 3*b* is formed along the inner surface of the entire peripheral wall 3*a* of the upper cover 3 to form the electric junction box 1 as a double-wall construction, and the peripheral wall 2*a* of the case body 2 is fitted between the peripheral wall 3*a* and the rib 3*b* to thereby construct the entire electric junction box 1 to have a watertight construction.

In the above-described construction, the electric junction box 1 is allowed to be watertight by the doublewall construction composed of the entire peripheral wall 3*a* of the upper cover 3 and the rib 3*b*. The electric junction box 1 becomes large by providing the entire periphery of the electric junction box with the double wall. When there is a limitation in the space in which the electric junction box 1 is mounted, it is not easy to mount it in the space. In addition, when the rib 3*b* is formed on the entire peripheral wall 3*a*, it is liable to warp aid shrink. Thus a problem may occur in an assembling work. Patent Document 1: Japanese Patent Application Laid-Open No. 9-308053.

SUMMARY OF THE INVENTION

The present invention has been made in view of the above-described problem. Accordingly, it is an object of the present invention to provide a necessary portion of a fuse box with a watertight construction having a reliable watertight performance without making the fuse box large.

To achieve the object, the present invention provides a fuse box which accommodates a bus bar connected with a battery terminal in a case body thereof and has a fuse connected with the bus bar in the case body. The fuse box is mounted on a battery box with an upper cover in connection with the case body.

A lower end surface of a peripheral wall of the upper cover is brought into contact with a bottom wall of a lower cover that is locked to the case body of the fuse box or brought into contact with a bottom wall of the case body to form a first watertight portion. A peripheral wall erect on the bottom wall of the case body is formed by spacing the peripheral wall at a pressure-reducing gap from an inner surface of the upper cover. An upper end of the peripheral wall of the case body is bent and projected toward an inner surface of the peripheral wall of the upper cover to form a second watertight portion. The pressure-reducing gap is interposed between the first watertight portion and the second watertight portion. The pressure-reducing gap reduces a high pressure of water which has penetrated into the fuse box from the outside through the first watertight portion, thus making it impossible for the water to pass through the second watertight portion disposed above the first watertight portion.

The above-described waterproof mechanism is constructed by using Bernoulli's theorem and the law of conservation of mass. That is, when water penetrates into the upper cover at a high pressure from a slight gap of the first watertight portion, the water is moved in a right-to-left direction in the pressure-reducing gap interposed between the first watertight portion and the second watertight portion. As a result, the pressure of the water disperses and decreases. Owing to the shortage of the pressure, the water is incapable of passing through the slight gap of the second watertight portion. Thereby it is possible to prevent the water from penetrating into the case body 11. The waterproof mechanism provides stable, constant, and high waterproof performance, thereby preventing the fuse from being exposed to water and corroded.

The fuse box may be provided with a waterproof mechanism having the first watertight portion, the pressure-reducing gap, and the second watertight portion at a peripheral position where the fuse is disposed.

That is, it is desirable to form the waterproof mechanism on the entire periphery of the fuse box in terms of waterproof performance. Water which has penetrated to other portions of the fuse box is exhausted from drain holes formed on a lower portion of the fuse box. Therefore the waterproof mechanism may be provided in only a portion on the periphery of the fuse-disposed position which is required to be unexposed to water. The space for the pressure-reducing gap when the waterproof mechanism is provided on a part of the entire periphery is smaller than the space for the pressure-reducing gap when the waterproof mechanism is provided on the entire periphery. Thereby it is possible to improve the layout of the fuse box and make the fuse box compact.

As is apparent from the foregoing description, according to the present invention, the pressure-reducing gap disperses water which has penetrated into the fuse box at a high pressure from the first watertight portion and reduces the pressure, thus preventing the water from penetrating into the case body from the second watertight portion. Further, even when the peripheral wall of the upper case, the case body or the lower cover warps or shrinks, the watertight performance provided by the waterproof mechanism is not affected adversely. Thus the waterproof mechanism has reliable waterproof function.

Further by forming the waterproof mechanism in only a portion on the periphery of the fuse-disposed position, it is possible to prevent the fuse from being exposed to water, improve the layout of the fuse box, and make the fuse box compact in a favorable balance.

BRIEF DESCRIPTION OF THE DRAWINGS

FIG. 4 shows an upper cover, in which FIG. 4A is a plan view showing the upper side thereof, and FIG. 4B is a side view.

FIG. 5 shows a lower cover, in which FIG. 5A is a plan view showing the inner side thereof, and FIG. 5B is a side view.

DETAILED DESCRIPTION OF THE PREFERRED EMBODIMENTS

Figure 1:
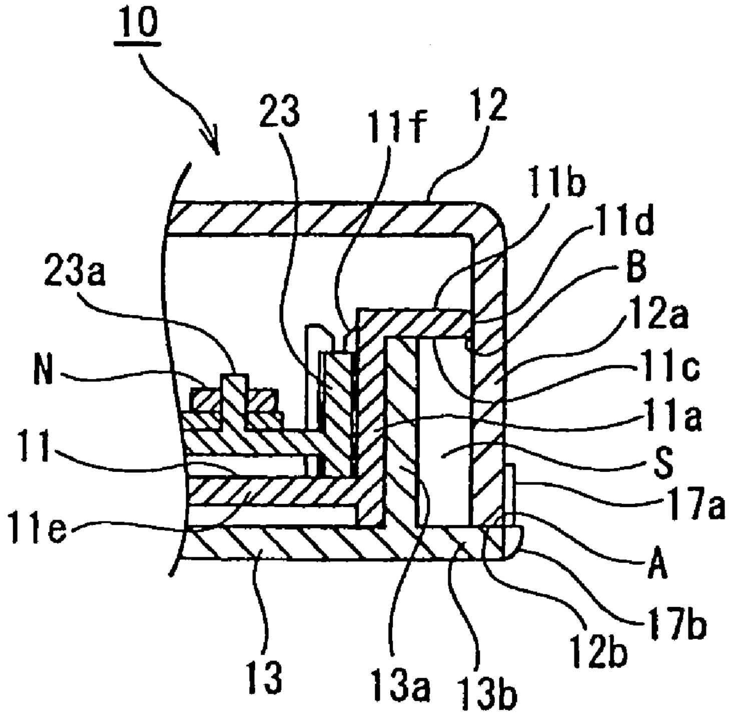
FIG. 1 is an enlarged sectional view showing a waterproof mechanism of a fuse box according to a first embodiment of the present invention.

The embodiments of the present invention will be described below with reference to the drawings. The present invention is applied to a fuse box disposed in a water penetration region of an engine room of a vehicle.

FIGS. 1 through 5 show a fuse box 10 of the first embodiment of the present invention. The fuse box 10 has a case body 11; a plurality of bus bars 21, 22, and 23 provided on the case body 11; fusible links 25, 26 connected with the bus bars 21, 22, and 23; and an upper cover 12 and a lower cover 13 mounted on the case body 11 to cover the upper and lower surfaces thereof, with the case body 11, the upper cover 12, and the lower cover 13 connected with one another. The fuse box 10 is mounted on a battery box 40.

Figure 2:
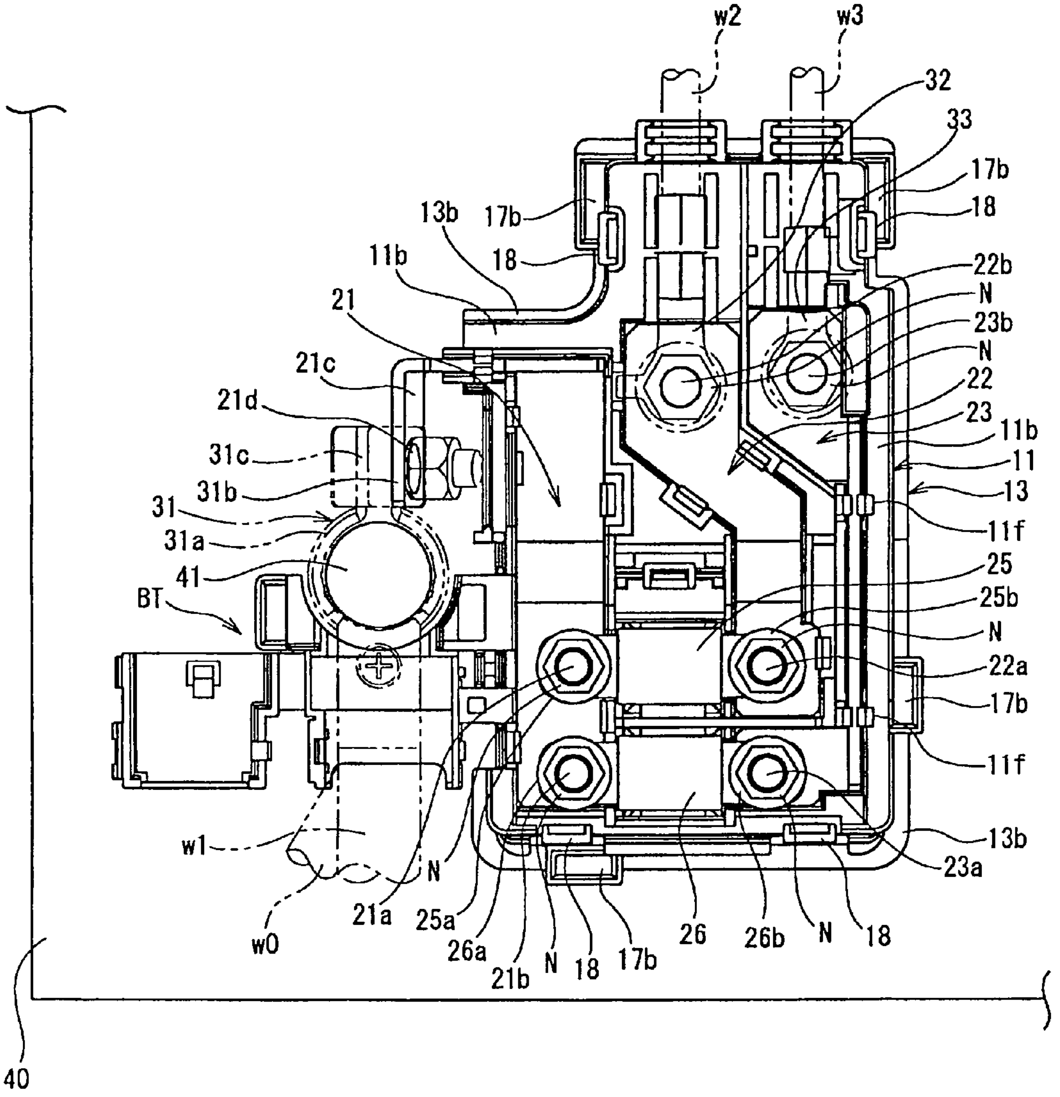
FIG. 2 is a plan view showing the fuse box placed on a battery box.

More specifically, as shown in FIG. 2, one input-side bus bar 21 and two output-side bus bars 22, 23 are disposed on an upper surface of the case body 11. An input terminal 25*a* of the fusible link 25 and an input terminal 26*a* of the fusible lnk 26 are fitted on bolts 21*a*, 21*b* respectively projected from one side of the input-side bus bar 21 and fastened to the bolts 21*a*, 21*b* with nuts N respectively. An output terminal 25*b* of the fusible link 25 is fitted on a bolt 22*a* disposed at one side 6 the output-side bus bar 22 and fastened thereto with the nut N. An output terminal 26*b* of the fusible link 26 is fitted on a bolt 23*a* disposed at one side of the output-side bus bar 23 and fastened thereto with the nut N.

These bus bars 21 through 23 are fixed to the case body 11 by a bus bar fixing claw 11*f* projected at a side inward from a predetermined position of a peripheral wall 11*a* of the case body 11.

The other side of the input-side bus bar 21 is formed as a connection piece 21*c* to be connected to a battery terminal 31 of a battery terminal BT. The battery terminal 31 is crimped to an electric wire w1 connected to a starter and to an electric wire w0 connected with a relay box. The battery terminal 31 has a circular-arc portion 31*a* at a distal end thereof and a pair of tightening pieces 31*b*, 31*c* projected from the circular-arc portion 31*a*. A bolt hole 21*d* communicating with a bolt hole (not shown) formed on the tightening pieces 31*b*, 31*c* is formed on the connection piece 21*c* of the input-side bus bar 21.

A bolt 22*b* is projected from the other side of the output-side bus bar 22. As shown in FIG. 2, a perforated terminal 32 crimped to an output electric wire w2 is fitted on the bolt 22*b* and fastened thereto with the nut N. Similarly a bolt 21*b* is projected from the other side of the output-side bus bar 22. A perforated terminal 33 crimped to an output electric wire w3 is fitted on the bolt 23*b* and fastened thereto with the nut N.

As shown in FIG. 1, an entire peripheral wall 12*a* of the upper cover 12 is formed as a single-wall construction. When the upper cover 12 is placed on the case body 11, a lower end surface 12*b* of the peripheral wall 12*a* is brought into contact with an upper surface of an outermost periphery of a bottom wall 13*b* of the lower cover 13 which is locked to the case body 11 to form a first watertight portion A. As shown in FIGS. 4A and 4B, a locking portion 17*a* which locks a to-be-locked portion 17*b* of the lower cover 13 which will be described later is formed on an outersurface of the peripheral wall 12*a*.

As shown in FIGS. 5A and 5B, a peripheral wall 13*a* is erected at an inner position spaced at a predetermined interval from the outermost periphery of the bottom wall 13*b* of the lower cover 13. As shown in FIG. 1, when the upper cover 12 is placed on the case body 11, a gap S is formed between the peripheral wall 12*a* of the upper cover 12 and the peripheral wall 13*a* of the lower cover 13.

The to-be-locked portion 17*b* is formed at a predetermined position of the upper surface of the bottom wall 13*b* of the lower cover 13 by projecting the to-be-locked portion 17*b* outward from the outermost periphery of the bottom wall 13*b*.

A drain hole 15 is formed in penetration through the bottom wall 13*b* of the lower cover 13. More specifically, one drain hole 15*a* is formed immediately below the position where the fusible links 25, 26 are mounted. Two drain holes 15*b* are formed below a position where the output-side bus bar 22 and the perforated terminal 32 are connected to each other and below a position where the output-side bus bar 23 and the perforated terminal 33 are connected to each other.

Figure 3:
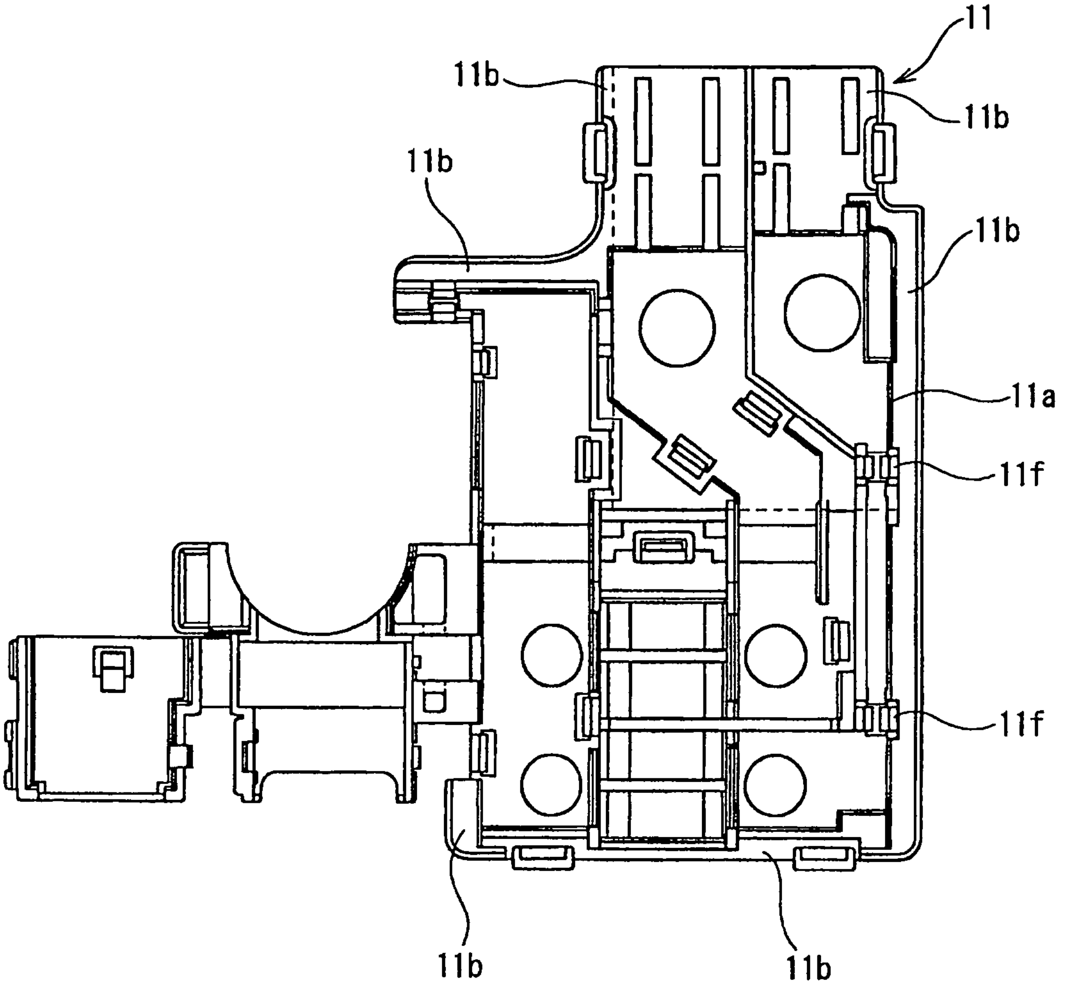
FIG. 3 is a plan view showing a case body.
Figure 4:
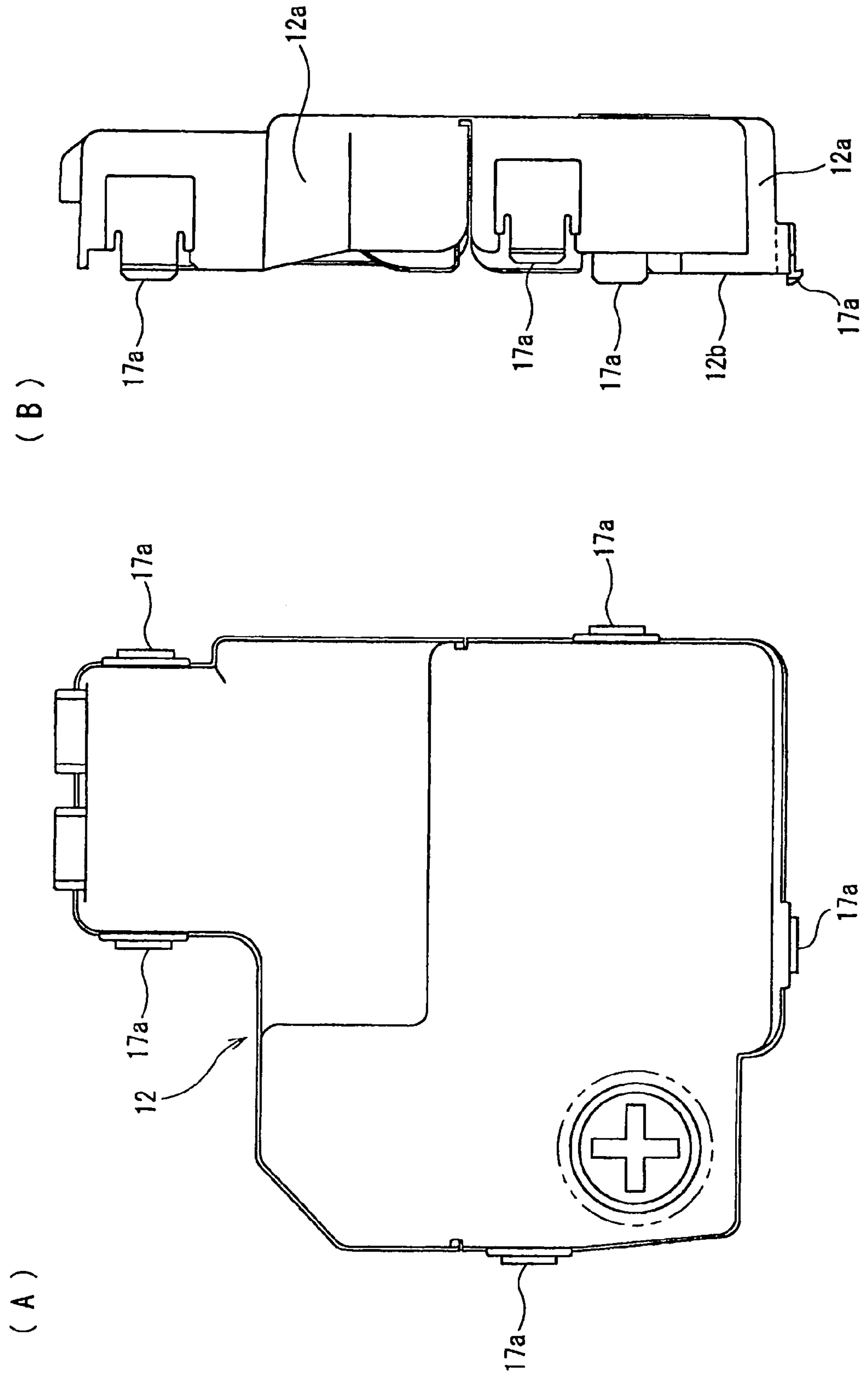
Figure 5:
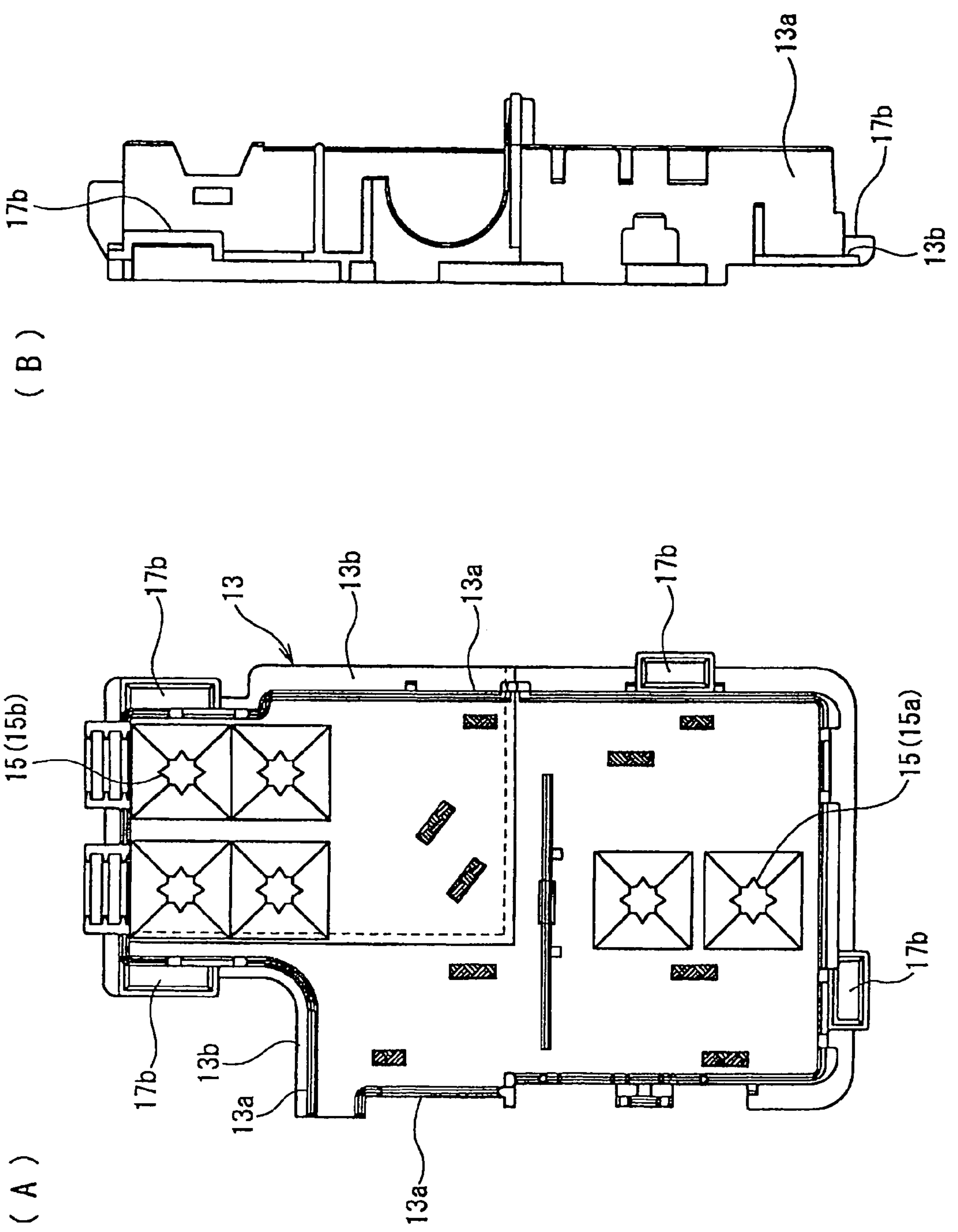

As shown in FIG. 1, when the lower cover 13 and the case body 11 are locked to each other, a peripheral wall 11*a* formed on the entire periphery of the case body 11 is disposed inward from the peripheral wall 13*a* of the lower cover 13 and an outer surface of the peripheral wall 11*a* is in contact with an inner surface of the peripheral wall 13*a* of the lower cover 13. As shown in FIGS. 2 and 3, except a portion where the battery terminal BT is mounted and a portion where output electric wires w2, w3 are derived, the upper end of the whole length of the peripheral wall 11*a* is bent outward to form a rib 11*b* projectingly. As shown in FIG. 1, a lower surface 11*c* of the rib 11*b* contacts an upper end surface of the peripheral wall 13*a* of the lower cover 13. An outer end surface 11*d* of the rib 11*b* contacts an inner surface of the peripheral wall 12*a* of the upper cover 12 to form a second watertight portion B.

A drain hole 16 is formed in penetration through a bottom wall 11*e* of the case body 11.

The method of fixing the fuse box 10 having the above-described construction onto the battery box 40 is described below.

Initially the lower cover 13 is placed on the lower surface of the case body 11. Thereafter as shown in FIG. 2, the case body 11 and the lower cover 13 are connected to each other at a locking portion 18.

Thereafter as shown in FIG. 2, the circular-arc portion 31*a* of the battery terminal 31 is fitted on the battery post 41 projected upward from the battery box 40. A bolt hole of each of the tightening pieces 31*b*, 31*c* and the bolt hole 21*d* of the connection piece 21*c* of the input-side bus bar 21 are overlapped on each other. After a bolt B is inserted into the bolt holes, the nut N is tightened to fixedly fit the circular-arc portion 31*a* on the battery post 41 so that the battery and the fusible links 25, 26 are electrically connected with each other and the fuse box 10 is fixed to the upper surface of the battery box 40.

Finally, the upper cover 12 is placed on the upper surface of the case body 11. Thereafter the locking portion 17*a* of the upper cover 12 and the to-be-locked portion 17*b* of the lower cover 13 are locked to each other.

As shown in FIG. 1, the fuse box 10 having the above-described construction has on the periphery thereof a pressure-reducing gap S surrounded with the peripheral wall 12*a* of the upper cover 12, the peripheral wall 13*a* of the lower cover 13 and the bottom wall 13*b* thereof, and the rib 11*b* of the case body 11. The pressure-reducing gap S is interposed between the first watertight portion A and the second watertight portion B located above the first watertight portion A. Therefore, if water penetrates into the fuse box at a high pressure from a slight gap of the first watertight portion A, the water moves in a right-to-left direction in the pressure-reducing gap S. As a result, the pressure of the water disperses and decreases. Owing to the shortage of the pressure, it is impossible for the water to penetrate into the case body 11 from the second watertight portion B.

Figure 6:
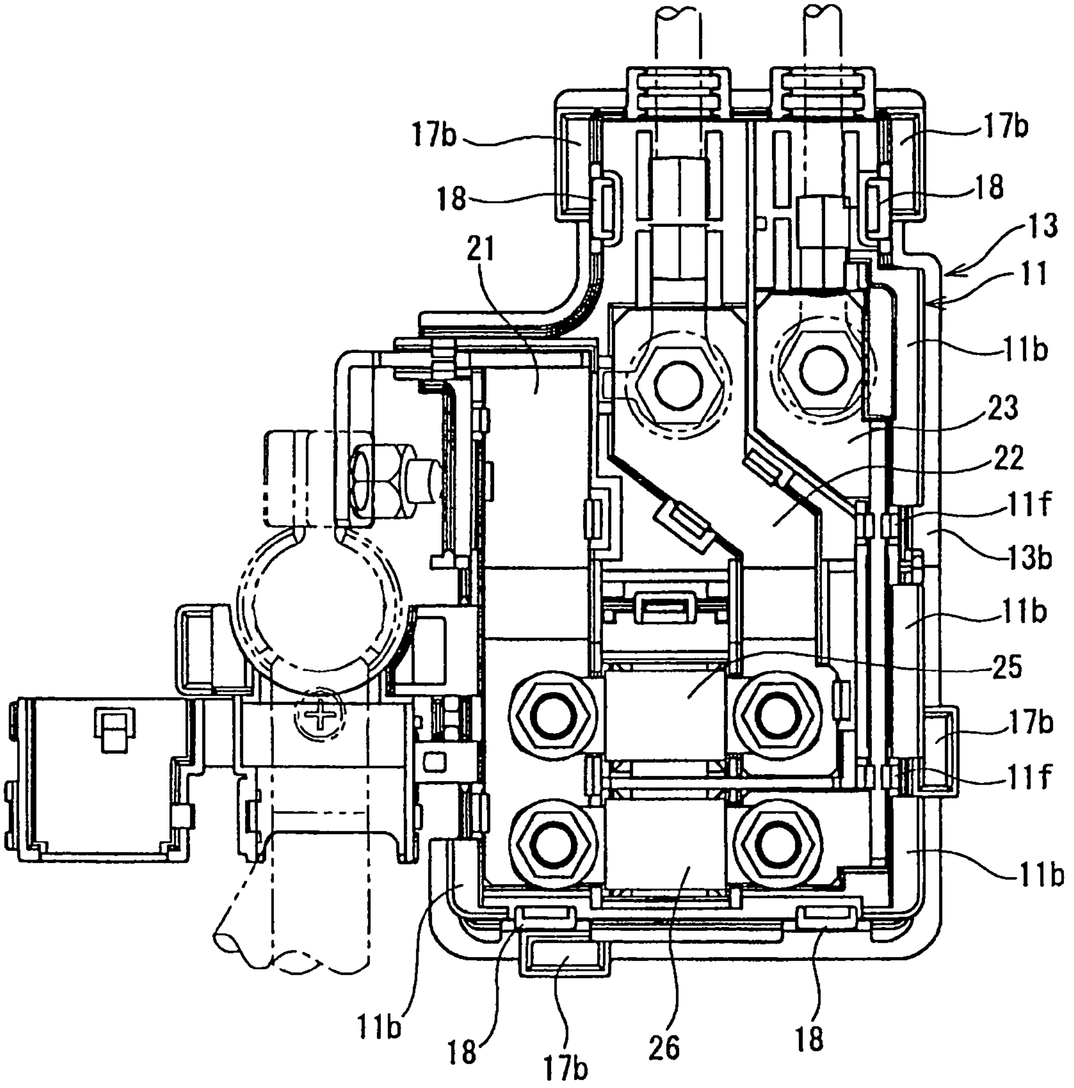
FIG. 6 is a plan view showing the inside of a fuse box according to a second embodiment of the present invention.
Figure 7:
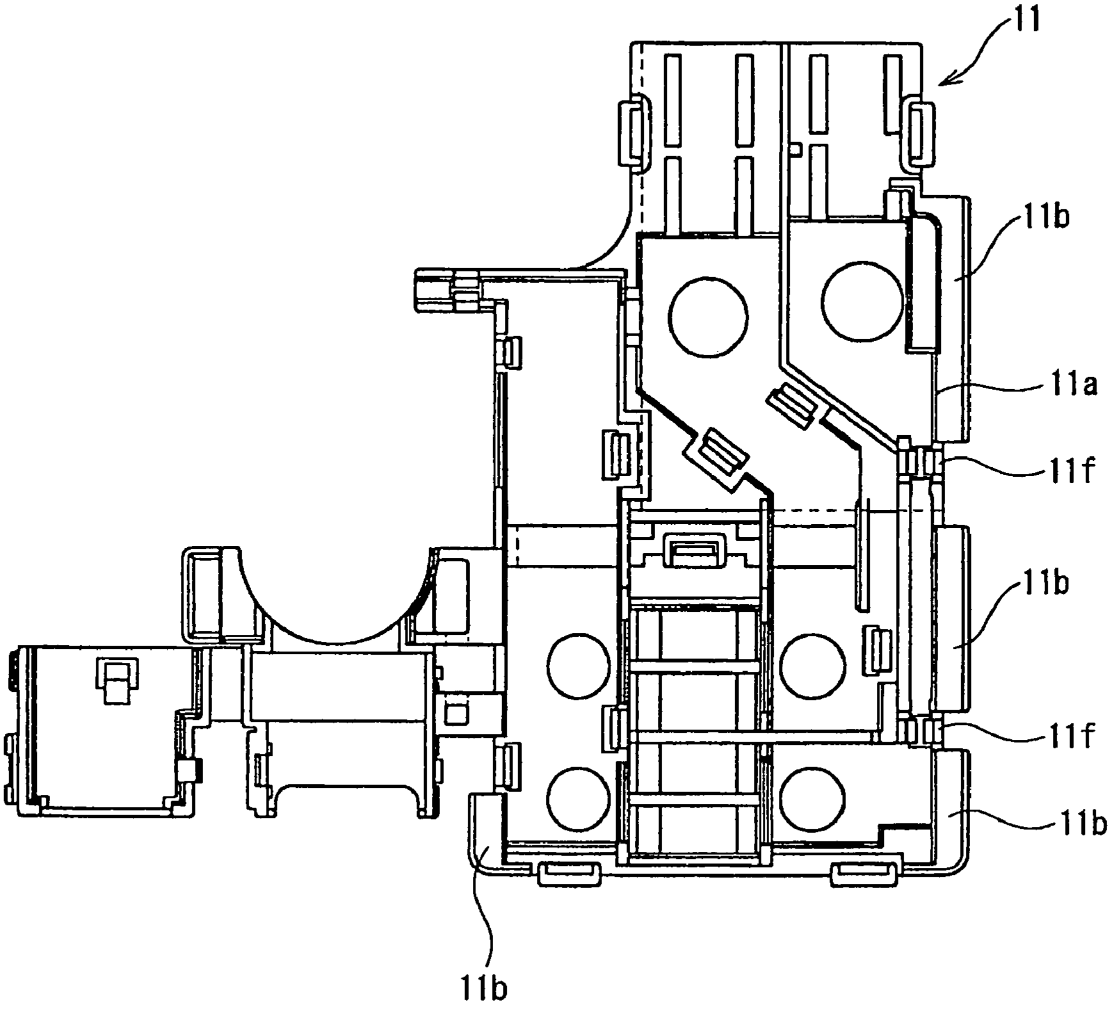
FIG. 7 is a plan view showing the case body shown in FIG. 6.

FIGS. 6*a* and 7 show the second embodiment of the present invention. The second embodiment is different from the first embodiment in the formation range of the rib 11*b*. Other constructions of the second embodiment are the same as those of the first embodiment. Thus the same parts of the second embodiment as those of the first embodiment are denoted by the same reference numerals as those of the first embodiment, and description thereof is omitted herein.

More specifically, in the peripheral wall 11*a* of the case body 11, the rib 11*b* is projectingly formed only at a position on the periphery of the portion where the fusible links 25, 26 are disposed and at a position on the periphery of the portion where the output-side bus bar 23 is disposed. The rib 11*b* is not formed in the portion where the bus bar fixing claw 11*f* is formed at the side inward from the peripheral wall 11*a* of the case body 11.

In the second embodiment, the pressure-reducing gap S and the first watertight portion A and the second watertight portion B sandwiching the pressure-reducing gap S therebetween are disposed at positions on the periphery of the portion where the fusible links 25, 26 requiring a high degree of waterproofness are disposed. Therefore it is possible to constantly secure the waterproofness necessary for the fuse box 10. By not providing other peripheral portions with the waterproof mechanism, it is possible to improve the layout of the fuse box 10 and make it compact.

Figure 8:
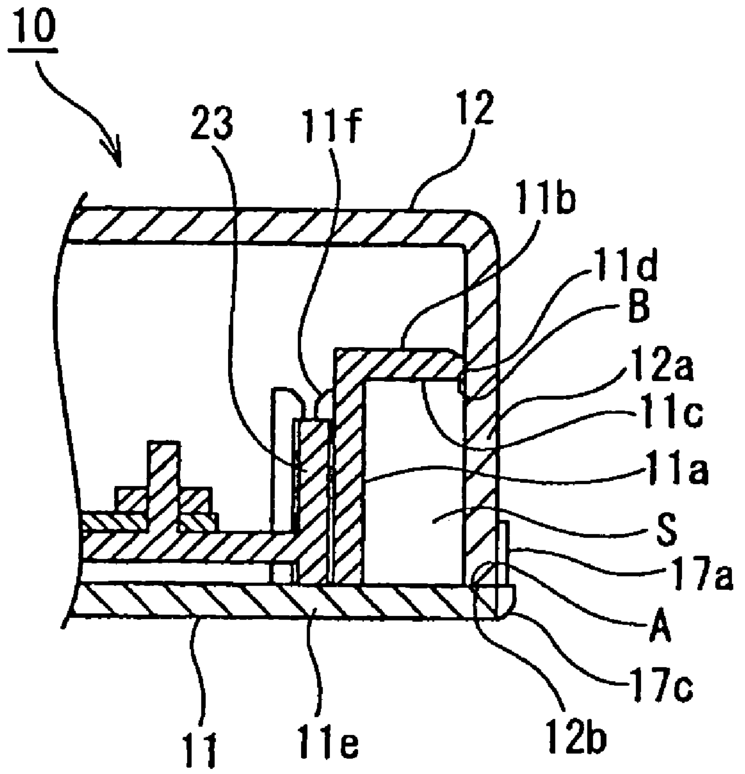
FIG. 8 is an enlarged sectional view showing a waterproof mechanism of a fuse box according to a third embodiment of the present invention.
Figure 9:
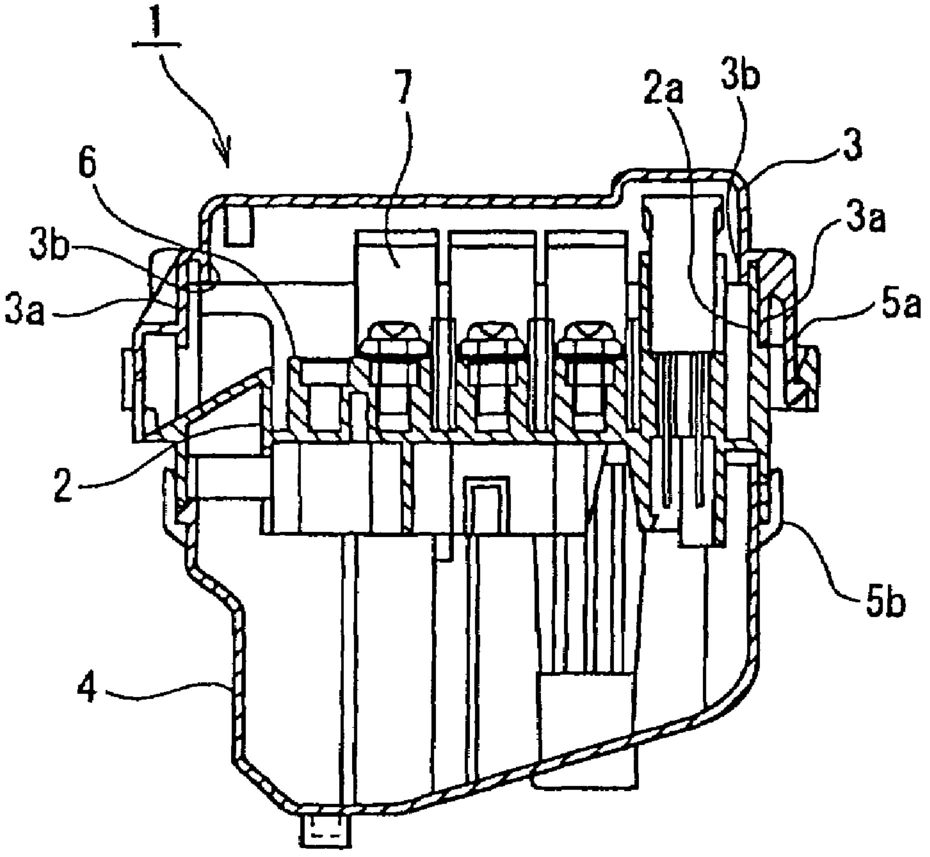
FIG. 9 shows a conventional art.

FIG. 8 shows the third embodiment of the present invention. The third embodiment is different from the first and second embodiments in that the fuse box of the third embodiment does not have the loner cover and that the waterproof mechanism is constructed of the upper cover 12 and the case body 11.

More specifically, the lower end surface 12*b* of the peripheral wall 12*a* of the upper cover 12 contacts the upper surface of the outermost periphery of tie bottom wall 11*e* of the case body 11 to form the first watertight portion A. The peripheral wall 11*a* of the case body 11 is erected at a position spaced by a predetermined length from the inner surface of the peripheral wall 12*a* of the upper cover 12. The upper end of the peripheral wall 11*a* is bent outward to project the rib 11*b*. An outer end surface of the rib 11*b* contacts the inner surface of the peripheral wall 12*a* of the upper cover 12 to form the second watertight portion B.

In the third embodiment, although the lower cover is not provided, the pressure-reducing gap S sandwiched between the first watertight portion A and the second watertight portion B is formed between the peripheral wall 12*a* of the upper cover 12 and the peripheral wall 11*a* of tie case body 11. Therefore, the pressure-reducing gap S disperses water which has penetrated into the fuse box at a high pressure from the first watertight portion A and reduces the pressure, thus preventing the water from penetrating into the case body 11 from the second watertight portion B.

What is claimed is:

1. A fuse box which accommodates a bus bar connected with a battery terminal in a case body and has a fuse connected with said bus bar in said case body, said fuse box being mountable on a battery box with an upper cover in connection with said case body, wherein:

a lower end surface of a peripheral wall of said upper cover is brought into contact with a bottom wall of a lower cover that is locked to said case body of said fuse box or brought into contact with a bottom wall of said case body to form a first watertight portion;

a peripheral wall erect on said bottom wall of said case body is formed by spacing said peripheral wall at a pressure-reducing gap from an inner surface of said upper cover;

an upper end of said peripheral wall of said case body is bent and projected toward an inner surface of said peripheral wall of said upper cover to form a second watertight portion;

said pressure-reducing gap is interposed between said first watertight portion and said second watertight portion; and said pressure-reducing gap reduces a high pressure of water which has penetrated into said fuse box from the outside through said first watertight portion, thus suppressing said water from passing through said second watertight portion disposed above said first watertight portion.

2. A fuse box according to claim 1, further comprising a waterproof mechanism having said first watertight portion, said pressure-reducing gap, and said second watertight portion at a peripheral position where said fuse is disposed.

* * * * *